(12) United States Patent
Kanemura

(10) Patent No.: US 8,595,734 B2
(45) Date of Patent: Nov. 26, 2013

(54) REDUCTION OF PROCESSING TIME WHEN CACHE MISS OCCURS

(75) Inventor: Kenji Kanemura, Tokyo (JP)

(73) Assignee: NEC Corporation, Tokyo (JP)

( * ) Notice: Subject to any disclaimer, the term of this patent is extended or adjusted under 35 U.S.C. 154(b) by 100 days.

(21) Appl. No.: 13/147,973

(22) PCT Filed: Feb. 25, 2010

(86) PCT No.: PCT/JP2010/052987
§ 371 (c)(1),
(2), (4) Date: Aug. 4, 2011

(87) PCT Pub. No.: WO2010/098394
PCT Pub. Date: Sep. 2, 2010

(65) Prior Publication Data
US 2011/0302590 A1 Dec. 8, 2011

(30) Foreign Application Priority Data

Feb. 27, 2009 (JP) ................................. 2009-045875

(51) Int. Cl.
*G06F 9/46* (2006.01)
(52) U.S. Cl.
USPC ........................................................ 718/102
(58) Field of Classification Search
None
See application file for complete search history.

(56) References Cited

U.S. PATENT DOCUMENTS

2005/0071843 A1 3/2005 Guo et al.

FOREIGN PATENT DOCUMENTS

| JP | 2549241 B | 10/1996 |
| JP | 2003015883 A | 1/2003 |
| JP | 2006146865 A | 6/2006 |
| JP | 2009020797 A | 1/2009 |

OTHER PUBLICATIONS

International Search Report for PCT/JP2010/052987 mailed Apr. 13, 2010.
European search report for EP10746273.1 dated Oct. 15, 2012.

*Primary Examiner* — Gregory A Kessler

(57) ABSTRACT

Communication performance of inter-process communication in enhanced for the entire program processing. A process allocation system is provided with a processor which executes a process including a process for performing mutual inter-process communication and holding a logical process placement system, and a process allocation module for allocating each process to the processor, wherein the process allocation module is provided with an inter-processor communication capacity acquisition module for acquiring the communication performance of inter-processor communication which the processor performs with other different processor, a module for specifying the dimensional direction in which the communication traffic of inter-process communication is high in the logical process placement system, and a module for determining a processor having a higher communication performance of inter-processor communication as the allocation destination of a process which is set in the dimensional direction of higher inter-process communication traffic.

8 Claims, 4 Drawing Sheets

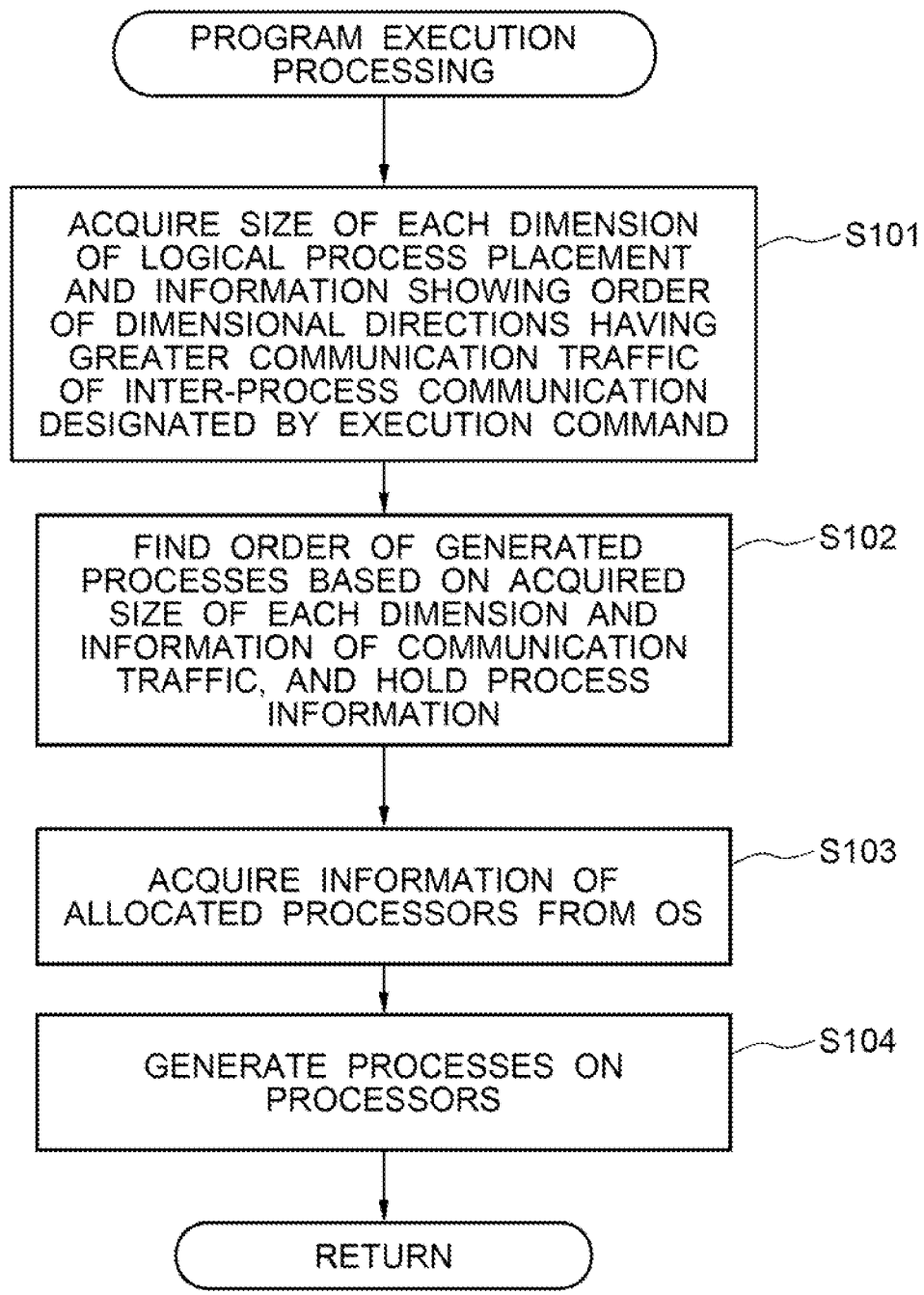

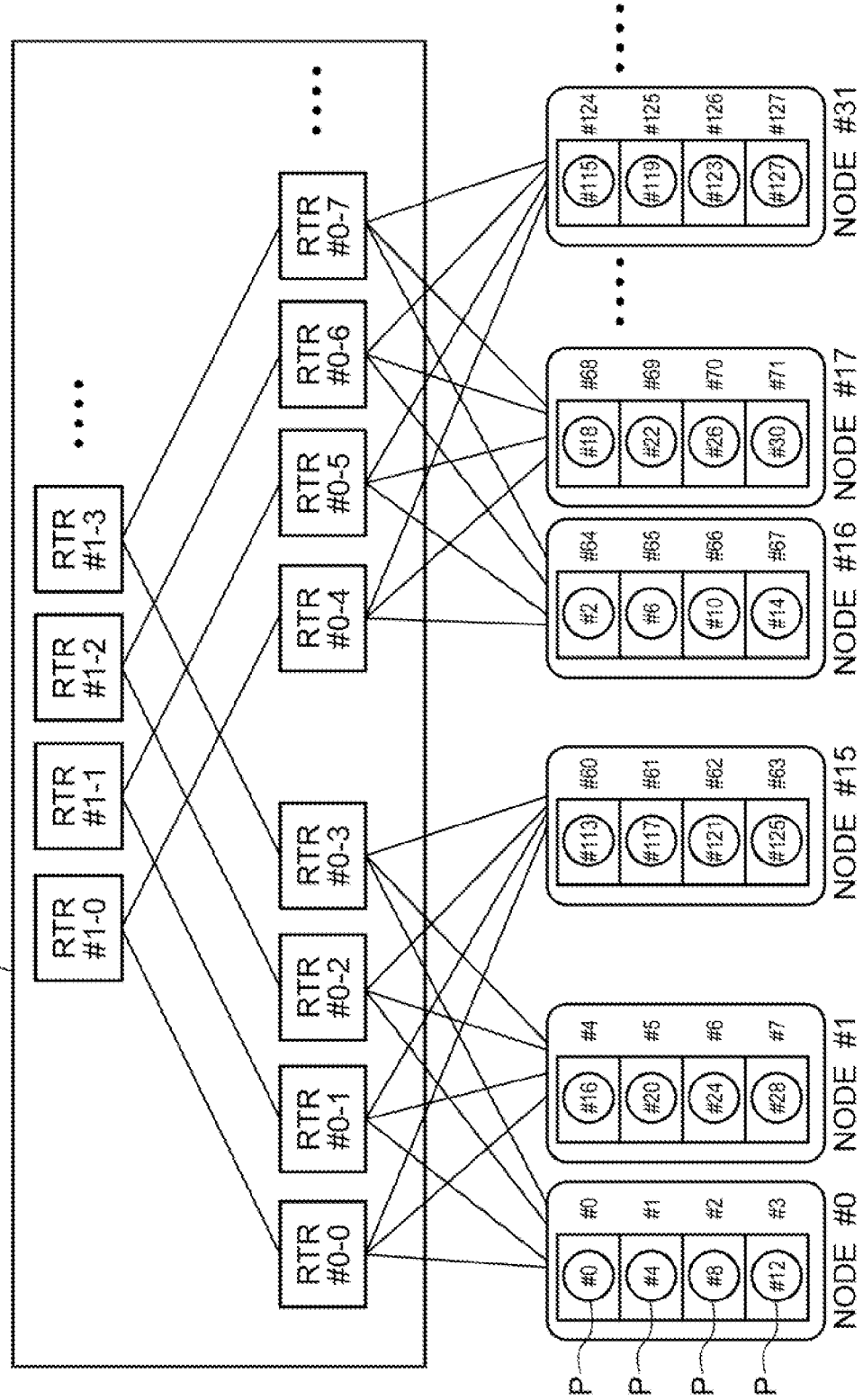

REDUCTION OF PROCESSING TIME WHEN CACHE MISS OCCURS

TECHNICAL FIELD

The present invention relates to a process allocation system, a process allocation method, and a process allocation program for increasing communication efficiencies of inter-process communications performed in program processing executed in a computer system.

BACKGROUND ART

In a computer system employing a single-stage cross bar network, for example, of a super computer or the like, each processor set within the system has uniform communication time regardless of the connected position thereof. Thus, the communication time between the processes becomes uniform regardless of which processor within the system the processing process is generated and placed.

However, in accordance with an increase in the number of nodes placed within the system, there are more and more systems which employ network structures such as multi-stage cross bar network, fat tree, two-dimensional or three-dimensional mesh, and torus.

In those computer systems, the distances between the connected processors are not necessarily equal on the network. Thus, the communication time exchanged between the processes varies depending on which processing process is generated on which of the processors.

Therefore, in terms of the communication performance, it is desirable for the processing processes (group) having a great amount of communication traffic in the inter-processor communications to be placed within a processor group whose inter-process communication (referred to as "HW communication" hereinafter) performance is high as much as possible. However, in that case, it is necessary to determine (select) which processing process of what rank and attribute is placed or allocated to which of the processors for each of the processing processes. It takes a lot of effort and operation cost, and requires a long processing time for achieving that.

As a related technique thereof, there is disclosed a method which selects a calculation processor that executes a loop calculation that can be done in parallel based on the inter-processor communication traffic calculated from an information table registered in advance (Patent Document 1).

Patent Document 1: Japanese Unexamined Patent Publication 2003-015883

DISCLOSURE OF THE INVENTION

Problems to be Solved by the Invention

However, even though the related technique disclosed in Patent Document 1 mentioned above is capable of reducing the inter-processor communication traffic through optimally selecting the calculation processor which executes the loop calculation that can be done in parallel, it is not capable of improving the performance of the inter-process communication itself within a logical process placement system.

An object of the present invention is to improve the inconveniences of the related technique, and to provide a process allocation system, a process allocation method, and a process allocation program, which can effectively increase the communication performance of the inter-process communications related to the entire program processing.

Means for Solving the Problems

In order to achieve the foregoing object, the process allocation system according to the present invention is a process allocation system which includes a processor which performs execution contents of a processing process group that holds a pre-set logical process placement system containing processing processes which mutually perform inter-process communications and a process allocation module which allocates each of the processing processes to the processor, and the process allocation system employs a structure which includes: an inter-processor communication capacity acquisition module which acquires a communication performance of an inter-processor communication exchanged between the processor and another different processor; and an inter-process communication traffic specification module which specifies a dimensional direction having a higher communication traffic of the inter-process communications in the logical process placement system, wherein the process allocation module includes an allocation destination determining function which determines the processor exhibiting a still higher communication performance of the inter-processor communication as an allocation destination of the processing process set in the dimensional direction having a still greater inter-process communication traffic.

Further, the process allocation method according to the present invention is a process allocation method for allocating each processing process to a processor which performs execution processing of a processing process group that holds a pre-set logical process placement system containing each of the processing processes which mutually perform inter-process communications, and the process allocation method is characterized to include: acquiring a communication performance of an inter-processor communication exchanged between the processor and another different processor; specifying a dimensional direction having a higher communication traffic of the inter-process communications in the logical process placement system; and performing allocation from the processing process of a dimensional direction having a still greater inter-process communication traffic to the processor exhibiting a still higher communication performance of the inter-processor communication.

Furthermore, the process allocation program according to the present invention is a process allocation program for allocating each processing process to a processor used in a process allocation system which includes the processor for performing execution processing of a processing process group that holds a pre-set logical process placement system containing processing processes which mutually perform inter-process communications, and the process allocation program is characterized to cause a computer provided to the process allocation system to execute: an inter-processor communication capacity acquiring function which acquires information showing a communication performance of an inter-processor communication exchanged between the processor and another different processor; an inter-process communication traffic specifying function which specifies a dimensional direction having a higher communication traffic of the inter-process communications in the logical process placement system; and an allocation destination determining function which performs allocation from the processing process of the dimensional direction having a still greater inter-process communication traffic in an orderly manner to the processor exhibiting a still higher communication performance of the inter-processor communication.

Effect of the Invention

The present invention can provide the process allocation system, the process allocation method, and the process allocation program, which can increase the communication performance of the inter-process communications related to the entire program processing through specifying the processor group exhibiting high communication efficiency (performance) of the inter-processor communication and allocating the processing of processing processes having a more inter-process communication traffic to the processor group.

BRIEF DESCRIPTION OF THE DRAWINGS

FIG. 3 is a flowchart showing the entire operation processing steps of the process allocation system disclosed in FIG. 1; and FIG. 4 is a schematic block diagram showing an example of the structural contents a multi-stage cross bar switch of the process allocation system disclosed in FIG. 1.

BEST MODES FOR CARRYING OUT THE INVENTION

Next, basic structures of an exemplary embodiment of the invention will be described.

In this exemplary embodiment, as shown in FIG. 4, node #0, node #1, - - - , node #31 are connected via routers (RTR) of #0-0 to 0-7 and #1-0 to 1-3 constituting a multi-stage cross bar switch 20 formed in multiple stages (two stages in this case), and four processors P are provided within each node to execute a dispersed parallel program.

Figure 1:
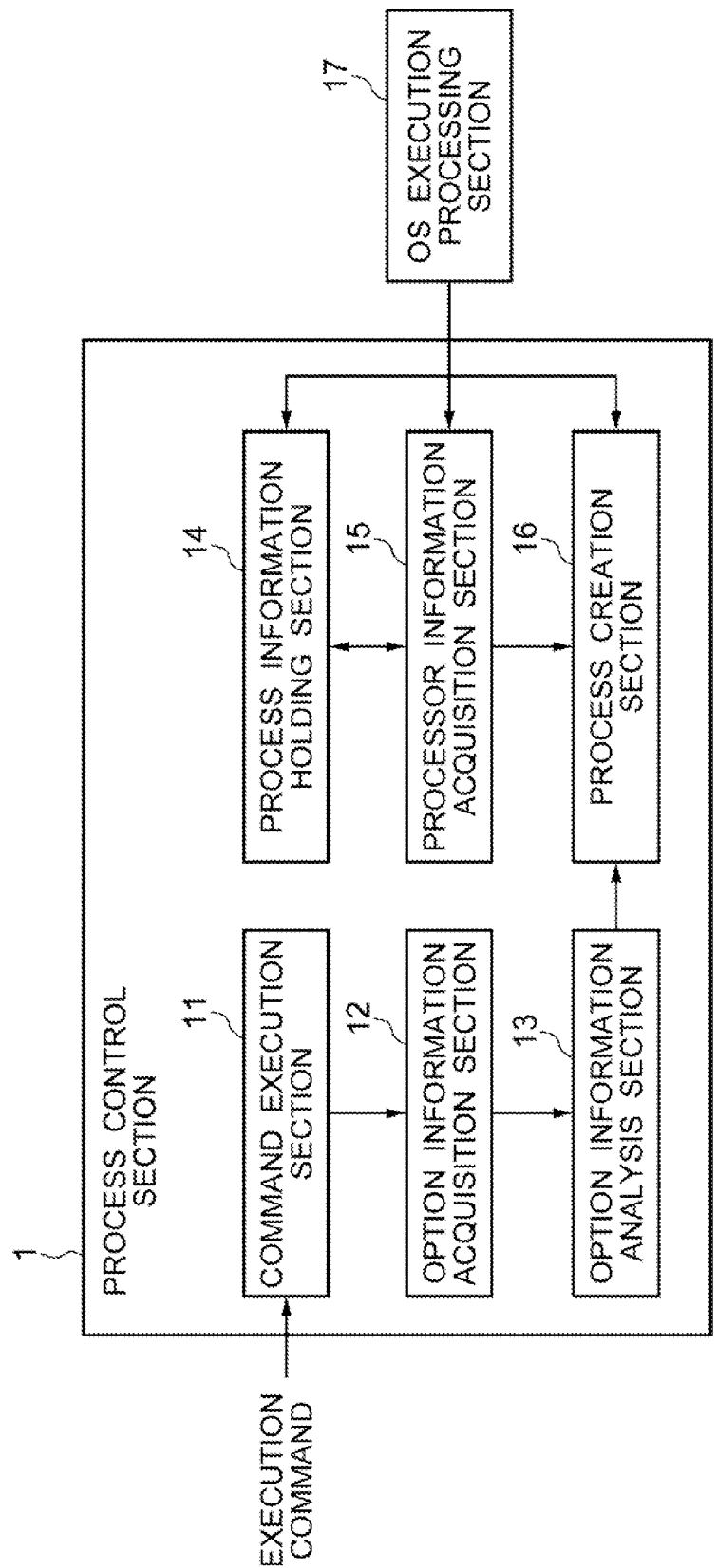
FIG. 1 is a schematic block diagram showing a first exemplary embodiment of a process control section of a process allocation system according to the present invention.

Further, as shown in FIG. 1, this exemplary embodiment includes a process control section 1 which executes processing for allocating (arranging) the processing processes to the processors P according to information designated by an execution command or the like.

The process control section 1 is constituted with: a command execution section 11 which executes a dispersed parallel program; an option information acquisition section 12 which acquires option information designated by an execution command; an option information analysis section 13 which analyzes the option information, and calculates logical placement positions of the processes and order of the generated processes; a process information holding section 14 which holds information of the analyzed processes; a processor information acquisition section 15 which acquires inter-processor HW communication performance information of the allocated process from OS (operation system); and a process creation section 16 which creates the processes of the dispersed parallel program on the processors.

Note here that each processor P set on each node performs execution processing of a processing process (referred to as "process" hereinafter) allocated by the process control section 1.

The command execution section 11 has a logical process placement information acquiring function which acquires each dimensional size of the processing process (process) in the pre-set logical process placement system and information (communication traffic order information) showing the order of the dimensional directions carrying a greater amount of communication traffics of the inter-process communications at the time of executing the dispersed parallel program.

Note here that each dimensional size of the processes of the logical process placement system and the communication traffic information are designated via a command line interface given as an argument to an execution command of the dispersed parallel program.

It is so defined here that the execution command of the dispersed parallel program is "mpirun", an option designating the size of each dimension is "-nprocs", and an option designating the information showing the order of the dimensional directions having a greater communication traffic is "-order".

Figure 2:
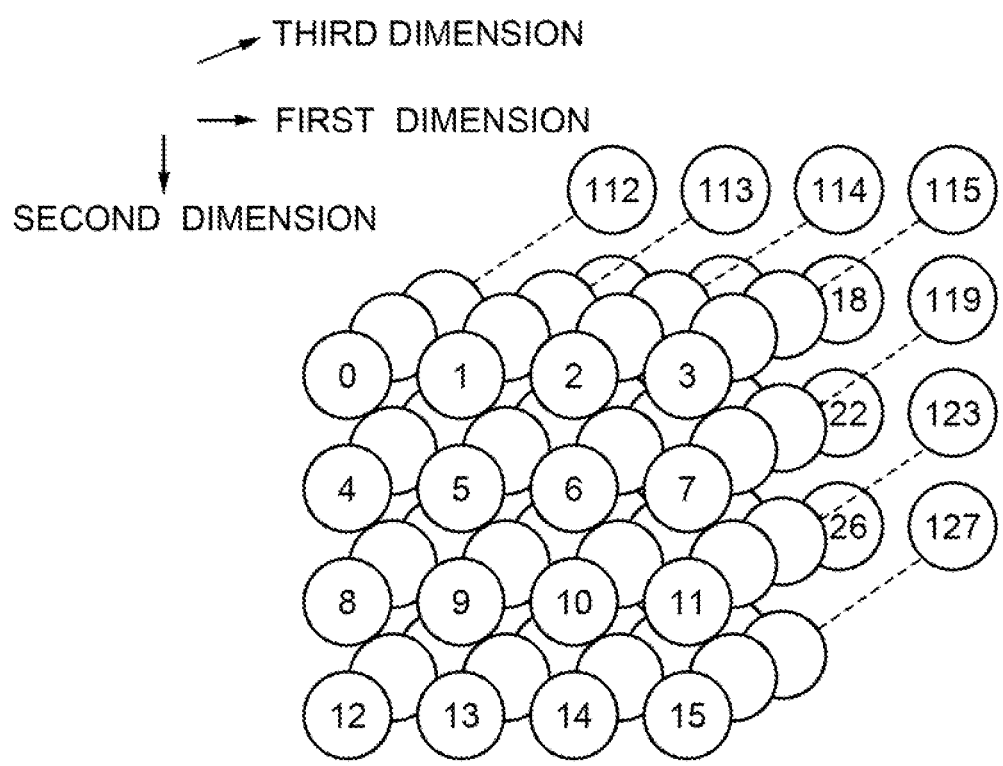
FIG. 2 is an explanatory illustration showing an example of a logical process placement system of the process allocation system disclosed in FIG. 1.

Further, the logical process placement system of this exemplary embodiment is a three-dimensional logical process placement system. As shown in FIG. 2, it is constituted with three dimensions in which the size of the first dimension is 4, the size of the second dimension is 4, and the size of the third dimension is 8.

Furthermore, it is so defined that the communication traffic of the inter-process communication in the three-dimensional logical process placement system is greater in order of the two-dimensional direction, the three-dimensional direction, the one-dimensional direction.

Further, the command execution section 11 has a command executing function which performs execution processing of a command sent as an execution command (execution request: mpirun).

The option information acquisition section 12 has an inter-process communication information acquiring function which acquires each dimension size of the logical process placement system designated in the execution command (mpirun) and the communication traffic information of the inter-process communication.

Further, the option information acquisition section 12 gives the acquired size of each dimension of the logical process placement system and the communication traffic information of the inter-process communication to the option information analysis section 13 as the option information.

The option information analysis section (an inter-processor communication capacity acquiring module) 13 performs calculation for finding the order of the generated processes based on the option information given by the option information acquisition section 12 (a processing process order calculating function), and stores the calculation result information to the process information holding section 14 (a process order storing function).

The processing operation of the option information analysis section 13 will be described by referring to FIG. 2.

In FIG. 2, each processing process is illustrated schematically by a circle, and number within the circle shows ID (rank) of the processing process.

Further, in a case where the size of the logical process placement system is "4×4×8", the process rank that is a relation between the coordinate and the process rank is calculated by following Expression 1 provided that the coordinate of the process is (X, Y, Z).

$$\text{Process Rank} = X + 4 \times Y + 4 \times 4 \times Z \qquad \text{(Expression 1)}$$

With this, when "-order2-3-1" is designated as an option, for example, each processing process is to be generated in the order of the process rank determined by following Expression 2.

$$\text{for}(X=0; X<4; X++)$$

$$\text{for}(Z=0; Z<8; Z++)$$

$$\text{for}(Y=0; Y<4; Y++)$$

$$\text{Process Rank} = X + 4 \times Y + 4 \times 4 \times Z \qquad \text{(Expression 2)}$$

The processor information acquisition section (inter-processor communication traffic specifying module) 15 is provided by being connected to an OS execution processing section 17 that is set in advance on the outside of the process control section 1 for controlling the execution processing of the operating system (OS) of the computer system, and has a processor information acquiring function for acquiring and holding the processor information sent from an OS execution processing section 17.

The processor information is to contain the inter-processor communication (HW) performance of the processors set on each of the nodes and the processor groups performing the inter-processor communications shown in FIG. 4.

The process creation section (the process allocation module) 16 performs processing for allocating the processing process in (set in) the dimensional direction having a greater communication traffic on the logical process placement to the processor group having the high inter-processor HW communication performance based on the information acquired by the process information holding section 14 and the processor information acquisition section 15 (an allocation destination determining function).

While the command execution section 11, the option information acquisition section 12, the option information analysis section 13, the process information holding section 14, the processor information acquisition section 15, and the process creation section 16 contained in the process control section 1 is built as hardware in the explanations above, the command execution section 11, the option information acquisition section 12, the option information analysis section 13, the process information holding section 14, the processor information acquisition section 15, and the process creation section 16 may be built on software by causing the CPU to execute the process allocation program shown in FIG. 3. The process allocation program shown in FIG. 3 is recorded on a recording medium and treated as a target of commercial transaction.

FIG. 4 shows an example of a corresponding relation between processors and processes when the processing processes are placed based on the command designation.

Each of the nodes #0 to 31 of this system is constituted with four processors, and connected via a multi-stage cross bar switch 20.

The inter-process communications within the nodes #0 to #15 and the nodes #16 to #31 are done via a single-stage cross bar network, respectively.

Further, the mutual communications between the processing processes within the node #0 to #15 and the processing processes within the node #16 to #31 are communications exchanged via the multi-stage cross bar network via the routers (RTR).

It is also possible to employ a structure with which the user designates the size of each dimension in the logical process placement system and the information showing the order of the dimensional directions having a greater communication traffic of the inter-process communications exchanged between the processing processes by using a graphical user interface, for example.

Further, as a method for acquiring the information regarding the HW communication performance between the processors by the processor information acquisition section 15, it is also possible to employ a structure with which software set in advance other than an OS processing section acquires the processor information and provides the information to the processor information acquisition section 15.

Furthermore, the processor information regarding the processors (FIG. 4) placed within the system may be stored in advance to a storage module such as a memory that is set in advance within the processor information acquisition section 15, for example, within the process control section 1.

As described, it is possible to place (allocate) the processing processes to each processor more quickly and stably through employing a structure which carries the static inter-processor (HW) communication performance information set in advance and refers to the information.

Further, it is also possible to employ a structure with which the processor information acquisition section 15 measures the inter-processor communication performance (HW communication performance information) of each of the processors at the time of executing the dispersed parallel program, and dynamically acquires the HW communication performance information.

Next, outlines of the operations of the exemplary embodiment will be described.

The option information acquisition section 12 specifies the dimensional direction having a greater communication traffic of the inter-process communication in the logical process placement system (an inter-process communication traffic specifying step), the processor information acquisition section 15 acquires the communication performance of the inter-processor communication exchanged between different processors (an inter-processor communication capacity acquiring step), and the process creation section 16 determines the processor having a still higher communication performance of the inter-processor communication as the allocation destination from the processing processes of the dimensional direction having a still greater inter-process communication traffic (an allocation destination determining step).

Note here that the execution contents of the inter-process communication traffic specifying step, the inter-processor communication capacity acquiring step, and the allocation destination determining step may be put into programs to be executed by a computer.

Next, the operations of the system according to the exemplary embodiment will be described in details by referring to a flowchart of FIG. 3.

First, the size of each dimension of the processing processes in the logical process placement system and the information (communication traffic order information) showing the order of the dimensional directions having a greater communication traffic of the inter-process communications between the processing processes are designated to the command execution section 11 at the time of executing the dispersed parallel program in the processors (program execution processing).

Note here that designation is done for the execution command of the dispersed parallel program through the command line interface as follows.

It is so defined here that the execution command of the dispersed parallel program is "mpirun", an option designating the size of each dimension is "-nprocs", and an option designating the information showing the order of the dimensional directions having a greater communication traffic" is "-order".

Further, it is assumed that the logical process placement system of this exemplary embodiment is constituted with three dimensions in which the size of the first dimension is 4, the size of the second dimension is 4, and the size of the third dimension is 8.

Furthermore, the communication traffic of the inter-process communication in the three-dimensional logical process placement system is designated to be greater in order of the two-dimensional direction, the three-dimensional direction, the one-dimensional direction.

When the command execution section 11 executes the execution command (mpirun), the option information acquisition section 12 acquires each dimension size of the logical process placement system and the communication traffic information designated in the execution command (mpirun), and gives those to the option information analysis section 13 (step S101).

Thereby, the option information analysis section 13 acquires the size of each dimension in the logical process placement (system) designated by the execution command and the information showing the order of the dimensional directions having a greater communication traffic of the inter-process communications.

The option information analysis section 13 performs calculation for finding the order of the generated processing processes based on the option information containing the size of each dimension and the information of the communication traffic of the process communication given by the option information acquisition section 12 (a processing process order calculating function), and stores the calculation result information to the process information holding section 14 as process information (step S102).

Now, the processing operation of the option information analysis section 13 will be described. In FIG. 2, each processing process is illustrated schematically by a circle, and number within the circle shows ID (rank) of the processing process.

Further, in a case where the size of the logical process placement system is "4×4×8", the process rank that is a relation between the coordinate and the process rank is calculated by following Expression 1 provided that the coordinate of the process is (X, Y, Z).

$$\text{Process Rank} = X + 4 \times Y + 4 \times 4 \times Z \qquad \text{(Expression 1)}$$

With this, when "-order2-3-1" is designated as an option, for example, each processing process is to be generated (allocated) on the processors in the order of the process ranks determined by following Expression 2.

$$\text{for}(X=0; X<4; X++)$$

$$\text{for}(Z=0; Z<8; Z++)$$

$$\text{for}(Y=0; Y<4; Y++)$$

$$\text{Process Rank} = X + 4 \times Y + 4 \times 4 \times Z \qquad \text{(Expression 2)}$$

Then, the processor information acquisition section 15 acquires the HW communication performance information of the processors and the processor groups from the OS execution processing section (step S103).

Thereafter, the process creation section 16 performs processing for allocating the processing processes (processes) set in the dimensional direction having a greater communication traffic in the logical process placement to the processor group having the high inter-processor HW communication performance based on the information acquired by the process information holding section 14 and the processor information acquisition section 15 (step S104).

Then, the allocated processing processes are executed by the processors, and shifted in a program execution processing state (returned).

An example of a corresponding relation between the processors and processes when the processing processes are placed based on the command designation is shown in FIG. 4.

Here, it is assumed that the processing processes (0 to 127: FIG. 2) constituting the logical process placement system are allocated by the process control section 1 to the processors provided on the nodes #0 to #31, respectively.

As shown in FIG. 4, each of the nodes #0 to 31 of this system is constituted with four processors, and connected via the multi-stage cross bar switch.

The inter-process communications within the nodes #0 to #15 and the nodes #16 to #31 are done via the single-stage cross bar network, respectively.

Further, the mutual communications between the processing processes within the node #0 to #15 and the processing processes within the node #16 to #31 are communications exchanged via the multi-stage cross bar network via the routers (RTR).

As described above, the exemplary embodiment makes it possible to place the processing processes in the dimensional direction having a greater communication traffic within the logical process placement system set in advance in order to the processor group exhibiting a high inter-processor hardware (HW) communication performance.

Therefore, the inter-process communications of the entire program can be done promptly, and the inter-process communication performance can be improved.

While the present invention has been described heretofore by referring to the embodiment (and EXAMPLE), the present invention is not limited only to the embodiment (and EXAMPLE). Various changes and modifications occurred to those skilled in the art can be applied to the structures and details of the present invention without departing from the scope of the present invention.

This Application claims the Priority right based on Japanese Patent Application No. 2009-045875 filed on Feb. 27, 2009 and the disclosure thereof is hereby incorporated by reference in its entirety.

INDUSTRIAL APPLICABILITY

The present invention can be effectively applied to a computer system which employs a network such as a multi-stage cross bar network, a fat tree, a two-dimensional or three-dimensional mesh, or a torus.

REFERENCE NUMERALS

1 Process control section
11 Command execution section
12 Option information acquisition section
13 Option information analysis section
14 Process information holding section
15 Processor information acquisition section
16 Process creation section

The invention claimed is:

1. A process allocation system, comprising a processor which performs execution contents of a processing process group that holds a pre-set logical process placement system containing processing processes which mutually perform inter-process communications and a process allocation module which allocates each of the processing processes to the processor, the process allocation system performing the inter-process communications within a plurality of nodes constituted by relating the processors to the logical process placement system of the processing process group and the mutual inter-process communications exchanged between the plurality of nodes, the system comprising:

an inter-processor communication capacity acquisition module which acquires a communication performance of an inter-processor communication within the plurality of nodes, the communication performance including any information that is exchanged between the processors; and an inter-process communication traffic specification module which specifies a dimensional direction having a higher communication traffic of the inter-process communications exchanged between the plurality of nodes, wherein the process allocation module includes an allocation destination determining function which determines the processor exhibiting a still higher communication performance of the inter-processor communication as an allocation destination of the processing process set in the dimensional direction having a still greater inter-process communication traffic.

2. The process allocation system as claimed in claim 1, comprising a dimensional direction information input module which inputs and designates, to the inter-process traffic specification module, information showing size of each dimensional direction having the processing processes that constitute the logical process placement system set in advance and information showing inter-process communication traffic in each of the dimensional directions.

3. The process allocation system as claimed in claim 1, wherein the inter-processor communication capacity acquisition module includes an inter-processor communication performance acquiring function which acquires information showing communication performances of the inter-processor communications from an OS control section which performs execution processing of a pre-set operating system provided along the processor.

4. The process allocation system as claimed in claim 1, wherein the inter-processor communication capacity acquisition module includes a communication performance acquiring function which acquires, from each of the processors, communication performance information showing a communication performance for performing the inter-processor communication set in advance to each of the processors.

5. The process allocation system as claimed in claim 1, wherein the inter-processor communication capacity acquisition module includes a measured communication performance acquiring function which acquires communication performance information acquired by measuring the inter-processor communication performance of the processor group performing the inter-processor communication from each of the processors as the communication performance of the inter-processor communication, when the inter-processor communication is done while the processor is performing the execution processing.

6. A process allocation method for allocating each processing process to a processor which performs execution processing of a processing process group that holds a pre-set logical process placement system containing each of the processing processes which mutually perform inter-process communications, and performing the inter-process communications within a plurality of nodes constituted by relating the processors to the logical process placement system of the processing process group and the mutual inter-process communications exchanged between the plurality of nodes, the process allocation method comprising:

acquiring a communication performance of an inter-processor communication within the plurality of nodes, the communication performance including any information that is exchanged between the processors;

specifying a dimensional direction having a higher communication traffic of the inter-process communications exchanged between the plurality of nodes;

determining the processor exhibiting a still higher communication performance of the inter-processor communication as an allocation destination of the processing process set in the dimensional direction having a still greater mutual inter-process communication traffic.

7. A non-transitory computer-readable recording medium storing a process allocation program for allocating each processing process to a processor used in a process allocation system which comprises the processor for performing execution processing of a processing process group that holds a pre-set logical process placement system containing processing processes which mutually perform inter-process communications, and performing the inter-process communications within a plurality of nodes constituted by relating the processors to the logical process placement system of the processing process group and the mutual inter-process communications exchanged between the plurality of nodes, the process allocation program causing a computer to execute:

a function which acquires a communication performance of an inter-processor communication within the plurality of nodes, the communication performance including any information that is exchanged between the processors;

a function which specifies a dimensional direction having a higher communication traffic of the inter-process communications exchanged between the plurality of nodes; and a function which determines the processor exhibiting a still higher communication performance of the inter-processor communication as an allocation destination of the processing process set in the dimensional direction having a still greater mutual inter-process communication traffic.

8. A process allocation system, comprising a processor which performs execution contents of a processing process group that holds a pre-set logical process placement system containing processing processes which mutually perform inter-process communications and process allocation means for allocating each of the processing processes to the processor, the process allocation system performing the inter-process communications within a plurality of nodes constituted by relating the processors to the logical process placement system of the processing process group and the mutual inter-process communications exchanged between the plurality of nodes the system comprising:

inter-processor communication capacity acquisition means for acquiring a communication performance of an inter-processor communication within the plurality of nodes, the communication performance including any information that is exchanged between the processors; and inter-process communication traffic specification means for specifying a dimensional direction having a higher communication traffic of the inter-process communications exchanged between the plurality of nodes, wherein the process allocation means includes an allocation destination determining function which determines the processor exhibiting a still higher communication performance of the inter-processor communication as an allocation destination of the processing process set in the dimensional direction having a still greater inter-process communication traffic.

* * * * *